US012712923B2

(12) United States Patent
Finster

(10) Patent No.: US 12,712,923 B2
(45) Date of Patent: Aug. 18, 2026

(54) INTENT-BASED NETWORKING WITH IMPROVED CORRESPONDENCE BETWEEN INTENT AND SECURITY POSTURE

(71) Applicant: ABB Schweiz AG, Baden (CH)

(72) Inventor: Soeren Finster, Karlsruhe (DE)

(73) Assignee: ABB Schweiz AG, Baden (CH)

( * ) Notice: Subject to any disclaimer, the term of this patent is extended or adjusted under 35 U.S.C. 154(b) by 139 days.

(21) Appl. No.: 18/754,364

(22) Filed: Jun. 26, 2024

(65) Prior Publication Data

US 2024/0430310 A1 Dec. 26, 2024

(30) Foreign Application Priority Data

Jun. 26, 2023 (EP) .................................... 23181470

(51) Int. Cl.
*H04L 9/40* (2022.01)

(52) U.S. Cl.
CPC ............ *H04L 63/205* (2013.01); *H04L 63/10* (2013.01)

(58) Field of Classification Search
CPC ... H04L 63/205; H04L 63/10; H04L 41/0806; H04L 41/0816; H04L 63/1433; H04L 63/20; H04L 41/0803; H04L 41/16; H04L 41/28
See application file for complete search history.

(56) References Cited

U.S. PATENT DOCUMENTS 8,909,926 B2 12/2014 Brandt et al.
11,122,346 B1 * 9/2021 Kumar ................ H04L 63/0853
2020/0162517 A1 * 5/2020 Wong .................... H04W 12/08
2020/0380126 A1 12/2020 Schulz et al.
2022/0200863 A1 * 6/2022 Kotalwar ............ H04L 41/0813
2024/0179183 A1 * 5/2024 A ............................ H04L 63/20
2024/0305655 A1 * 9/2024 Liu ..................... H04L 41/0631

OTHER PUBLICATIONS

C. Li, O. Havel, A. Olariu, P. Martinez-Julia, J. Nobre, and D. Lopez. 2022. RFC 9316: Intent Classification. RFC Editor, USA. (Year: 2022).*

(Continued)

*Primary Examiner* — Michael R Vaughan
(74) *Attorney, Agent, or Firm* — Fitch Even Tabin & Flannery LLP

(57) ABSTRACT

A computer-implemented method for configuring a communication network based on a given intent comprising providing communications, the method comprising determining from the given intent by a given orchestration engine a candidate network configuration that, when implemented, causes the given intent to be realized; determining one or more changes to the security posture of the network that result from the candidate network configuration; determining based on a criterion, whether there is sufficient correspondence between the intent and the changes to the security posture; in response to determining that this correspondence is not sufficient, determining at least one amendment to the given intent such that, when a new candidate network configuration is determined based on this amendment to have a better correspondence between the amended intent and the resulting changes to the security posture of the network; and implementing the new candidate configuration in the communication network.

13 Claims, 2 Drawing Sheets

(56) References Cited

OTHER PUBLICATIONS

Zheng, Xiaoang, Aris Leivadeas, and Matthias Falkner. "Intent based networking management with conflict detection and policy resolution in an enterprise network." Computer Networks 219 (2022): 109457 (Year: 2022).*

Clemm et al., "Intent-Based Networking—Concepts and Definitions," *Federal University of Rio Grande do Sul* (*UFRGS*), Network Working Group, Internet-Draft, 28 pp. (Dec. 15, 2021).

International Telecommunication Union (ITU-T), "Network 2030—Architecture Framework," *Telecommunication Standardization Sector of ITU, Technical Report*, 146 pp. (2020).

Microsoft, "Microsoft Copilot for Security," product page, downloaded from the Internet on May 15, 2024, at https://www.microsoft.com/en-us/security/business/ai-machine-learning/microsoft-copilot-security#Overview, 5 pp. (2024).

European Patent Office, Extended European Search Report in European Patent Application No. 23181470.8, 12 pp. (Apr. 12, 2023).

* cited by examiner 5
1c
R
1d
4
1b
1c
R
1c
1b
1c
3
2:1a
1c
2a
2+2a
3
5a
1c
1a
1c
1e
4a

INTENT-BASED NETWORKING WITH IMPROVED CORRESPONDENCE BETWEEN INTENT AND SECURITY POSTURE

CROSS-REFERENCE TO RELATED APPLICATIONS

The instant application claims priority to European Patent Application No. 23181470.8, filed Jun. 26, 2023, which is incorporated herein in its entirety by reference.

FIELD OF THE DISCLOSURE

The present disclosure generally relates to intent-based networking, where a given abstract intent to provide communication is transformed into a concrete network configuration by an orchestration engine.

BACKGROUND OF THE INVENTION

Intent-based networking is a process that uses high levels of (artificial) intelligence, analytics, and orchestration to improve network operations. Operators describe the business outcomes they wish to accomplish; the network converts those objectives into the configuration necessary to achieve them.

The focus of the intent is on accomplishing the desired communication. The operator does not need to spend detailed thoughts on security. This is part of what is done automatically by the orchestration engine that converts the intent into a concrete network configuration. An intent-based networking solution might consider security properties and policies when converting intent to actual configuration, but consequences—especially security relevant consequences—of intent need to be known by network operators, even if automatically managed. This means that security is almost exclusively represented on configuration level, i.e., in the space of concrete configurations. These concrete configurations are necessarily a mixture of configuration elements that serve to provide the desired communication on the one hand, and configuration elements that serve to provide security on the other hand. This mixture is difficult to disentangle for network operators that primarily speak the language of intents.

BRIEF SUMMARY OF THE INVENTION

The present disclosure is generally related to embodiments of systems and methods that make the security configuration that results from the implementation of an intent more understandable and more maintainable, thereby improving the overall security posture of a network that implements network configurations derived from abstract intents.

The disclosure describes a computer-implemented method for configuring a communication network securely based on a given intent. This intent comprises at least the providing of a given form of communication. In particular, this given form of communication may be between two given entities, or from one entity to a plurality or multitude of other entities, such as to the public Internet. For example, the intent may comprise the transmission of certain data from a first entity to one or more second entities, or the providing, by a first entity, of a network service or of data to one or more second entities, or to a plurality or multitude of second entities, such as to the public Internet. Herein, the entities may be computers, other devices, or software applications. The intent is a high-level description of the desired outcome. It may, for example, be derived from the design of the application at hand.

In the course of the method, starting from a given intent, a given orchestration engine determines a candidate network configuration. When this candidate configuration is implemented, this causes the given intent to be realized. The candidate configuration is technically concrete and reflects the given intent. In particular, it may comprise configuration information for network resources, compute and I/O devices.

From the intent, and/or from the candidate network configuration, one or more changes to the security posture of the network that result from the candidate configuration are determined. For example, to provide a flow of data between entities, security rules of the network need to allow this data flow somehow. For example, if the first participant is to send the data to the second participant, the second participant may accept a direct connection from the first participant, or the first participant may get write access to deposit the data on a network share where the second participant gets read access.

Based on at least one given criterion, it is determined whether there is sufficient correspondence between the intent and the changes to the security posture. That is, it is determined whether the changes to the security posture are reflected in the intent to a sufficient degree. For example, it may be checked whether each change to the security posture is to be reasonably and unambiguously expected given the intent. For example, if the intent is to publish a certain file on the web, it clearly follows that a web server needs to be publicly available on the Internet, and the web server needs read access to this file.

When the correspondence between the changes to the security posture and the intent is not sufficient, then at least one amendment to the given intent is determined in a manner that, when a new candidate network configuration is determined by the orchestration engine based on this amendment, there is a better correspondence between the amended intent and the resulting changes to the security posture of the network. This new candidate configuration is implemented in the communication network.

BRIEF DESCRIPTION OF THE SEVERAL VIEWS OF THE DRAWING(S)

DETAILED DESCRIPTION OF THE INVENTION

Figure 1:
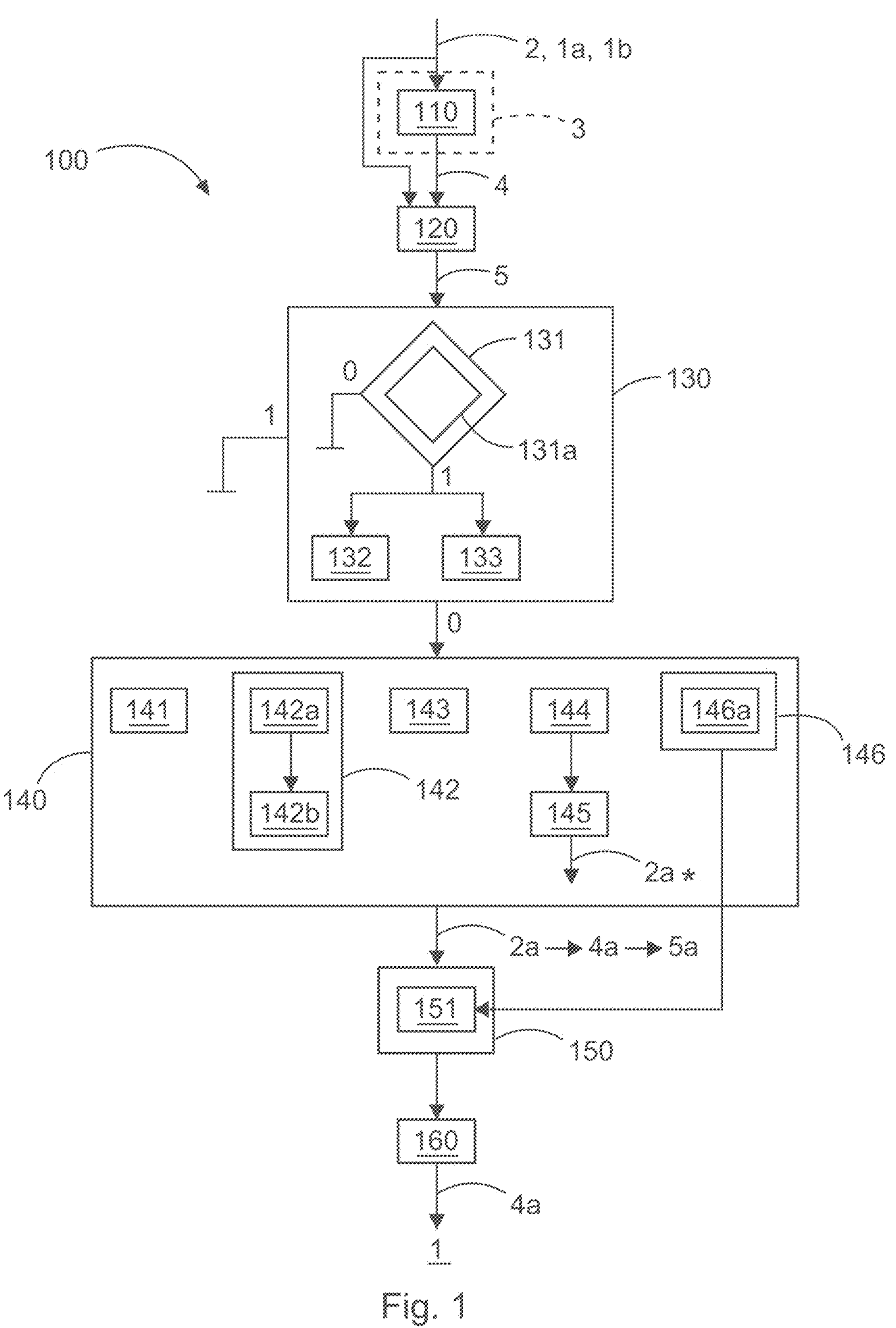
FIG. 1 is a flowchart for a method for configuring a communication network based on a given intent in accordance with the disclosure.

FIG. 1 is a schematic flow chart of an embodiment of the method 100 for configuring a communication network 1 based on a given intent 2. The given intent 2 comprises at least the providing of a given form of communication. In particular, this communication may be between two given entities 1*a*, 1*b*, or from one entity to a plurality or multitude of other entities, such as to the public Internet. It is not required that both entities 1*a*, 1*b* reside within the network 1; rather, one of them may reside outside that network 1, such as on the Internet.

In step 110, a given orchestration engine 3 determines a candidate network configuration 4 from the given intent 2.

When this candidate network configuration 4 is implemented in the communication network 1, the given intent 2 is realized.

In step 120, one or more changes 5 to the security posture of the network 1 that result from the candidate network configuration 4 are determined from the intent 2, and/or from the candidate network configuration 4.

In step 130, it is determined, based on at least one given criterion, whether there is sufficient correspondence between the intent 2 and the changes 5 to the security posture.

According to block 131, it may be checked, for at least one individual change 5 to the security posture, whether this individual change 5 fits a predetermined policy. If this is the case (truth value 1), it may, according to block 132, be determined that an explicit intent to cause this individual change 5 is required for sufficient correspondence between intent (2) and changes 5 to the security posture (if the individual change 5 is on a "yellow list" as discussed above), or according to block 133, be determined that this individual change 5 must be reduced or eliminated for sufficient correspondence between intent 2 and changes 5 to the security posture (if the individual change 5 is on a "red list" as discussed above). For example, the individual changes 5 that fit the predetermined policy may be on a predetermined list. According to block 131*a*, at least one change 5 that fits the predetermined policy may comprise the granting of public access to at least one resource in the network 1.

In step 140, in response to determining that the correspondence between the intent 2 and the changes 5 to the security posture is not sufficient (truth value 0 at step 130), at least one amendment 2*a* to the given intent 2 is determined. The goal is that, when a new candidate network configuration 4*a* is determined by the orchestration engine 3 based on this amendment 2*a* (and the un-amended part of the original given intent 2), there is a better correspondence between the amended intent 2, 2*a* and the resulting changes 5*a* to the security posture of the network 1.

According to block 141, at least one amendment 2*a* to the given intent 2 may comprise an explicit intent to cause at least one chosen change to the security posture from the determined changes 5.

According to block 142, at least one amendment 2*a* to the given intent 2 may be chosen to reduce or eliminate a change 5 to the security posture compared to the candidate network configuration 4.

In particular, according to block 142*a*, at least one change 5 to the security posture may comprise the granting, to a defined scope of client machines and/or people, access to at least one network resource. According to block 142*b*, the reducing of the change 5 may then comprise reducing the scope of machines and/or people, and/or the amount of network resources to which access is granted.

According to block 143, at least one amendment 2*a* to the given intent 2 may be queried from a trained machine learning model. In particular, such a machine learning model may receive one or more changes 5 to the security posture as input and produce the sought amendment 2*a* as output.

According to block 144, the resulting new correspondences between the intent 2, 2*a* and the changes 5 to the security posture may be determined for a plurality of candidate amendments 2*a*. According to block 145, a candidate amendment 2*a with the best new correspondence between the intent 2, 2*a and the changes 5 to the security posture may then be chosen as the amendment 2*a*.

According to block 146, multiple new candidate configurations 4*a* may be determined based on different candidate amendments 2*a*. In particular, according to block 146*a*, the multiple new candidate configurations 4*a* may represent different trade-offs between a scope of desired functionality on the one hand and a security posture of the network 1 on the other hand.

In the example shown in FIG. 1, in step 150, a network operator for confirmation of the amended intent 2, 2*a* that gives rise to this new candidate configuration 4*a*, so as to approve this new candidate configuration 4*a* before it is applied to the communication network 1.

In particular, according to block 151, the network operator may be prompted to choose one candidate amendment 2*a* out of multiple candidate amendments 2*a* that have been determined according to block 146.

In step 160, the new candidate configuration 4*a* is implemented in the communication network 1.

Figure 2:
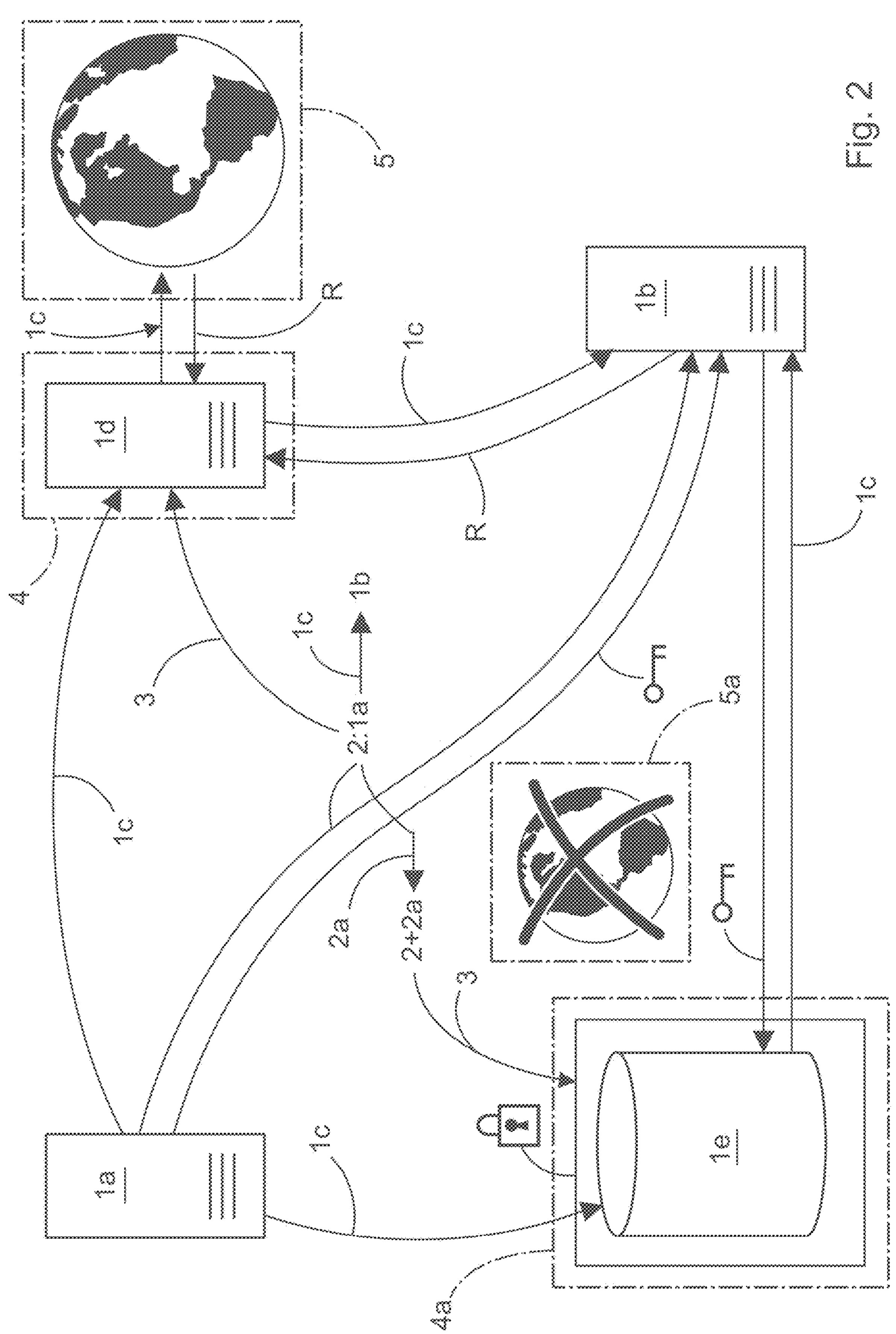
FIG. 2 is a diagram of an effect of the method shown in FIG. 1 for one exemplary given intent.

FIG. 2 illustrates the effect of the method 100 for one exemplary given intent 2. In this example, the given intent 2 comprises providing a service 1*c* from a first entity 1*a* to a second entity 1*b*.

When this intent 2 is processed by the given orchestration engine 3, one candidate network configuration 4 is to expose the service 1*c* on a system 1*d*, such that the system 1*d* can render it to the second entity 1*b* when the second entity 1*b* sends a request R. This achieves the goal as per the original intent—the service is made available from the first entity 1*a* to the second entity 1*b*. But the change 5 to the security posture comprises that anybody in the world may send a request R to the system 1*d* and consume the service 1*c*.

The present method 100 makes such changes 5 transparent on the level of intents 2 and provides amendments 2*a* to the intent 2 that cause the intent 2 and the changes 5 to the security posture to come into better correspondence.

In the example shown in FIG. 2, the amendment 2*a* to the intent 2 causes the candidate network configuration 4 to be modified into a new candidate network configuration 4*a*. The service 1*c* is placed onto a system 1*e* that has access control, as symbolized by the lock. The first entity 1*a* provides a key to the second entity 1*b*. With this key, the second entity 1*b* may consume the service 1*c* from the system 1*e*. The change 5*a* to the security posture is that there is no public access to the service 1*c*.

It has been determined that a better correspondence between the intent on the one hand, and the security posture on the other hand, makes the security posture that results from the given intent more intelligible to the network operator. Previously, the configuration elements relating to security just somehow came on top of the configuration elements relating to the mere providing of the desired communication. They were not visible to a network operator in the space of intents. It was therefore hard to monitor whether, given a set of intents, the resulting security configuration of the network as a whole still met all requirements. For example, the orchestration engine might translate the intent to make a set of certain files publicly available into the starting of a web server that exposes the whole directory, or even the whole drive, with the desired files publicly available for simplicity. Also, the use of a particular videoconferencing tool might require the opening of certain ports in the corporate firewall, so that the participants of the conference can communicate directly with each other. There are many more example applications where the default configuration "just works out of the box" at the price of granting more access than would be absolutely necessary. To keep the application working with a minimum of access rights requires a more elaborate security configuration.

When the security configuration is more transparently visible in the space of intents, it is also easier for network operators to adapt. In many situations, it is not possible to enjoy the full functionality of an application and a maximum security posture at the same time. Rather, some trade-off will be necessary, for instance, some functionality, performance or case-of-use will have to be sacrificed to improve the security posture.

For example, a network operator might provide the intent of providing network resources to allow for a certain bandwidth quality of service between two network devices. A straightforward intent-based networking orchestration might fulfill this by pushing the correct configuration to the network infrastructure and be done. A more advanced intent-based networking infrastructure might pull in additional (security) policies and current network configuration to arrive at the conclusion that this communication stream could be isolated from the rest of the network without changing the outcome of the intent.

However, if an intent-based networking orchestration comes to that conclusion and automatically applies isolation to that stream, then the intent does not match the actual resulting configuration completely. A better approach would be to include the desire for isolation in the intent. However, the reasoning about the possibility or necessity of isolation happened on different levels. Therefore, previously, this reasoning was not easily reflected in the intent. According to the present invention, an amendment to the original given intent is determined. This amendment may explicitly comprise the desire for isolation.

In a particularly advantageous embodiment, at least one amendment to the given intent comprises an explicit intent to cause at least one chosen change to the security posture from the determined changes. Thus, given this explicit intent, the chosen change to the security posture can be reasonably and unambiguously expected. This increases awareness and allows for a better monitoring whether the change to the security posture is really acceptable given the importance of the given intent. In particular, the change may be better verified against concrete security policies, such as a policy that no machine that is being used for productive work is allowed to expose any network service for unauthenticated public access. Also, some of the newly created intents might need to be approved by a higher authority, such as the head of the IT department or even management, before the resulting changes may be implemented in the network. In a figurative analogy, when users choose passwords, a time (or dollar amount in cloud computing charges) that is estimated for cracking the password might be displayed. The user may then decide whether to take the risk of granting full access to his account to anybody willing to spend this dollar amount. In an extreme example, he might be confronted with a message such as, “Look, standard-issue software available to anybody as a free download cracked this password faster than you could type it a second time in the confirmation box. Do you really want to use it?” In a corporate environment, a limitation may be enforced that passwords must cost at least a certain dollar amount, or more time than the interval between required regular password changes, to crack.

In a further particularly advantageous embodiment, at least one amendment to the given intent is chosen to reduce or eliminate a change to the security posture compared to the candidate network configuration. That is, the security configuration is not just transformed into an intent as it is, but it also improved at the same time. For example, it may be tested automatically whether each and every permission granted in the security configuration is really necessary. For example, using a communication application may entail a certain set of permissions by default to enable all of its features, but a company using the application will rarely use the complete set of features. Permissions that are necessary only for features that are not in use anyway may be avoided. In this manner, the security posture may be automatically steered towards the principle of least privilege: the most secure service is a service that is not exposed (or started at all) unless absolutely needed. Also, if the intent requires a certain type of service to be available (such as a web server), the amendment may cause limitations so that a web server with the least functionality required for the task at hand is exposed. For example, if only some static files are to be served, it is unnecessary to expose a full-featured web server that has functionality for more dynamic websites but also a rather large attack surface for exploitation. Rather, a simple web server that can do nothing more than serve static files may be exposed.

In particular, at least one change to the security posture may comprise the granting, to a defined scope of client machines and/or people, access to at least one network resource. The reducing of the change may then comprise reducing the scope of machines and/or people, and/or the amount of network resources to which access is granted. This may greatly reduce the exposed attack surface. For example, a large share of security vulnerabilities are privilege escalation vulnerabilities where an attacker having limited access to the resource, such as a normal user account on a computer, can expand this access to an unwanted level. But if the attacker has no access whatsoever, then he cannot exploit this vulnerability. Thus, for example, the reducing of the change may comprise disabling any guest or other unauthenticated access to the network resource. Also, the exploiting of many vulnerabilities at least requires the ability to initiate a network connection (or at least send a packet) to a service. Thus, limiting access to the service on a network level (such as by filtering based on source IP ranges) may not provide total security for the service on its own, but block a fair part of attacks from the outside world. In many applications, it is not really necessary to open a service to the whole world.

In a further particularly advantageous embodiment, in the course of determining whether there is sufficient correspondence between the intent and the changes to the security posture, it is checked, for at least one individual change to the security posture, whether this individual change fits a predetermined policy. If this is the case, there are two options for proceeding further. For example, individual changes that fit the predetermined policy may be on a predetermined list.

The first option is to determine that an explicit intent to cause this individual change is required for sufficient correspondence between intent and changes to the security posture. That is, the network operator is to be made fully aware of the security implications that the original given intent has. By approving the implementing of the new candidate configuration based on the amended intent, the network operator acknowledges and approves these security implications. The security implications may also prompt the network operator to introduce more security configurations, such as a reorganization of machines with Internet-facing services into a “demilitarized zone” with limited access to an internal network.

The second option is to determine that the individual change in question must be reduced or eliminated for sufficient correspondence between the intent and the changes to the security posture. That is, the change to the security posture is not deemed to be sufficiently corresponding to the intent unless an amendment to the intent is made with the goal of reducing or eliminating then change.

Thus, in a given network, there may be a "yellow list" of changes to the security posture that merely need to be explicitly reflected in the intent, and/or a "red list" (or "dirty dozen") of changes to the security posture that are not tolerable and need to be amended before implementation on the network. The method may work similar to a "security co-pilot" that informs the network operator about security risks, and depending on the severity of these risks gives him the option of acknowledging these risks explicitly and therefore knowingly taking them or even requires him to mitigate these risks.

The security co-pilot may be a component that analyses the whole process from high-level intent formulation down to the resulting configuration and configuration changes. It may make use of pre-defined security policies to perform reasoning itself or it will use additional tooling to perform security analysis of the resulting network configuration. The result of this process is an understanding between the high-level intent and the security properties of the configuration changes.

This understanding may then be reflected on intent-level to the network operator working on his intent. This provides immediate and actionable feedback to either improve the intent with regard to security properties or to include implicit security properties in the intent to reflect them properly and make them visible and maintainable.

Enabling technologies for understanding, reasoning and intent-formulation of the security co-pilot can be: natural language processing of intents and formulation of intent; large language models (like ChatGPT) to provide user-interface or intent formulation; security analysis (using, e.g., 3rd party tools) of network configuration; and matching of security configuration to security policies.

The tool may manifest itself in the user-interface for intent configuration. When network operators work on intent configuration, the tool may reason about the formulated intent in the background and provide security guidance on intent-level with suggestions or warnings that are directly actionable without requiring security expertise by the network operator.

This is already useful during initial intent configuration, but especially during later changes or additions to the intent configuration, the differential analysis will provide deeper insight in the security related changes and allow or even force the network operator to make those explicit.

In particular, at least one change to the security posture that fits the predetermined policy, e.g., by appearing on a predetermined ("yellow" or "red") list, may comprise the granting of public access to at least one resource in the network. In many network services, such as web servers, network shares, or remote access servers, public access is enabled by default, but not necessary for the intended job. For example, if it is known from which countries employees will need remote VPN access, then access can be limited to those countries. This might only be a handful of countries, so attacks from most countries can be blocked right from the start. On a finer level, many services are configured by default to grant access to all authenticated users even though only a limited number of users may need to use them. The network operator may therefore be forced to confirm that it is really necessary for everybody to have access, or forced to limit access to designated users.

Alternatively to, or in combination with, the "yellow" and "red" lists of changes to the security posture, such individual changes may be rated using a quantitative metric that may, for example, measure their severity. For example, it may then be stipulated that the correspondence between the intent and the changes to the security posture is insufficient if this rating, be it for an individual change or cumulative for all changes, exceeds a predetermined threshold value.

In a further particularly advantageous embodiment, the evaluating of changes to the security posture, and/or the determining of the amendment, is based at least in part on a security policy that governs the determining of the candidate network configuration from the given intent. Previously, when the intent was converted into a network configuration by the orchestration engine, this network configuration was some sort of "convolution" of the original intent with the security policy. This security policy can now be made more visible in the space of original intents, so that compliance with this policy can be more easily checked.

In a further particularly advantageous embodiment, at least one amendment to the given intent is queried from a trained machine learning model. The orchestration engine converts intents to candidate network configurations, and also modifies the security posture accordingly. The machine learning model may learn sort of an inverse function of this process, so that it can map the change to the security posture to a corresponding amendment to the intent.

In another particularly advantageous embodiment, in the course of determining at least one amendment to the given intent, the resulting new correspondences between the intent and the changes to the security posture may be determined for a plurality of candidate amendments. That is, for the new intent that is obtained by applying the at least one amendment to the original given intent, a candidate network configuration is determined in the usual manner by the orchestration engine. The changes to the security posture that this candidate network configuration contains are then examined as to how well they correspond to the amended intent. In particular, this process may be performed in an automated manner for many candidate amendments that span a suitable search space. A candidate amendment with the best new correspondence between the intent and the changes to the security posture is then chosen as the amendment to be finally applied to the original given intent. In this manner, correspondence between the intent and changes to the security posture may be optimized without requiring the use of gradient-based numeric optimization methods. It is difficult to apply such methods because the problem is a "mixed-integer problem", i.e., some variables of the problem are discrete: For example, you can only grant a particular access or not; you cannot grant access to a degree of 0.4 or 0.6.

Irrespective of the manner in which new proposals for amendments are obtained, the goal may always remain that, when the amended intent is provided to the given orchestration engine, this results only in changes to the security posture that fulfil at least one predetermined criterion with respect to the correspondence between these changes and the amended intent.

As discussed before, in a further particularly advantageous embodiment, a network operator is prompted for confirmation of the amended intent that gives rise to this new candidate configuration before implementing the new candidate configuration in the communication network. In this manner, the network operator may explicitly approve the changes to the security posture on the intent level, i.e., in the same space in which the original given intent was formulated.

In particular, multiple new candidate configurations may be determined based on different candidate amendments.

The network operator may be prompted to choose one candidate amendment. In this manner, a pre-selection of new candidate amendments that all have sufficient correspondence with the changes to the security posture in their resulting candidate configurations may be determined. From this pre-selection, the network operator may make the final selection of the amendment to the intent according to any particular need.

In particular, the multiple new candidate configurations, and thus the multiple new candidate amendments, may represent different trade-offs between a scope of desired functionality on the one hand and a security posture of the network on the other hand. As discussed before, it is frequently not possible to enjoy the full scope of available functionality and the highest level of security at the same time. At least something will have to be sacrificed on one side or on both sides. The network operator may choose to sacrifice the aspect that hurts least in the concrete application at hand. That is, the pre-selection of alternatives is produced in an automated manner, and the network operator only needs to make the one decision that is particularly hard to automate.

Because it is computer-implemented, the present method may be embodied in the form of a software. The invention therefore also relates to a computer program with machine-readable instructions that, when executed by one or more computers and/or compute instances, cause the one or more computers and/or compute instances to perform the method described above. Examples for compute instances include virtual machines, containers or server-less execution environments in a cloud. The invention also relates to a machine-readable data carrier and/or a download product with the computer program. A download product is a digital product with the computer program that may, e.g., be sold in an online shop for immediate fulfilment and download to one or more computers. The invention also relates to one or more compute instances with the computer program, and/or with the machine-readable data carrier and/or download product.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS

1 communication network
1*a*, 1*b* entities
1*c* to-be-conveyed file
1*d* Internet-facing web server
1*e* network attached storage
2 given intent
2*a* amendment to given intent 2
2*a optimal amendment 2***a*
3 orchestration engine
4 candidate network configuration based on intent 2
4*a* new candidate network configuration based on amendment 2*a*
5 change to security posture of network 1
5*a* new change to security posture after amendment 2*a*
100 method for configuring communication network 1
110 determining candidate network configuration 4
120 determining changes 5 to security posture
130 determining whether correspondence to intent 2 sufficient
131 checking whether change 5 fits a predetermined policy
131*a* public access as item that fits predetermined policy
132 determining that explicit intent is required
133 determining that reduction/elimination is required
140 determining amendment 2*a*
141 explicit intent as amendment 2*a*
142 reduction or elimination of change 5 as amendment 2*a*
142*a* granting of scope of access as change 5
142*b* reducing scope as reducing of change 5
143 querying amendment 2*a* from machine learning model
144 evaluating multiple candidate amendments 2*a*
145 choosing optimal candidate amendment 2*a**
146 determining multiple candidate configurations 4*a*
146*a* different trade-offs between functionality and security
150 prompting network operator for confirmation
151 choosing between multiple candidate amendments 2*a*
160 implementing new candidate network configuration 4*a*
R request

What is claimed is:

1. A computer-implemented method for configuring a communication network based on a given intent, the intent comprising at least the providing of a given form of communication, the method comprising:

determining from the given intent by a given orchestration engine a candidate network configuration that, when implemented, causes the given intent to be realized;

determining from the intent and/or from the candidate network configuration one or more changes to the security posture of the network that result from the candidate network configuration;

determining based on at least one given criterion whether there is sufficient correspondence between the intent and the changes to the security posture;

in response to determining that this correspondence is not sufficient, determining at least one amendment to the given intent such that, when a new candidate network configuration is determined by the orchestration engine based on the amendment, there is a better correspondence between the amended intent and the resulting changes to the security posture of the network; and implementing the new candidate configuration in the communication network.

2. The method of claim 1, wherein at least one amendment to the given intent comprises an explicit intent to cause at least one chosen change to the security posture from the determined changes.

3. The method of claim 1, wherein at least one amendment to the given intent is chosen to reduce or eliminate a change to the security posture compared to the candidate network configuration.

4. The method of claim 3, wherein at least one change to the security posture comprises the granting, to a defined scope of client machines and/or people, access to at least one network resource; and wherein the reducing of the change comprises reducing the scope of machines and/or people, and/or the amount of network resources to which access is granted.

5. The method of claim 1, wherein the determining whether there is sufficient correspondence between the intent and the changes to the security posture comprises:

checking, for at least one individual change to the security posture, whether this individual change fits a predetermined policy; and, when this is the case, determining that an explicit intent to cause this individual change is required for sufficient correspondence between intent and changes to the security posture; or determining that the individual change must be reduced or eliminated for sufficient correspondence between intent and changes to the security posture.

6. The method of claim 5, wherein at least one change that fits the predetermined policy comprises the granting of public access to at least one resource in the network.

7. The method of claim 1, wherein the evaluating of changes to the security posture, and/or the determining of the amendment, is based at least in part on a security policy that governs the determining of the candidate network configuration from the given intent.

8. The method of claim 1, wherein at least one amendment to the given intent is queried from a trained machine learning model.

9. The method of claim 1, wherein the determining at least one amendment to the given intent comprises:

determining, for a plurality of candidate amendments, the resulting new correspondences between the intent and the changes to the security posture; and choosing a candidate amendment with the best new correspondence between the intent and the changes to the security posture as the amendment.

10. The method of claim 1, further comprising before implementing the new candidate configuration in the communication network, prompting a network operator for confirmation of the amended intent that gives rise to this new candidate configuration.

11. The method of claim 10, wherein multiple new candidate configurations are determined based on different candidate amendments, and the network operator is prompted to choose one candidate amendment.

12. The method of claim 11, wherein the multiple new candidate configurations represent different trade-offs between a scope of desired functionality and a security posture of the network.

13. A non-transitory computer-readable storage medium having stored thereon machine-readable instructions that, when executed by one or more computers and/or compute instances, cause the one or more computers and/or compute instances to configure a communication network based on a given intent, the intent comprising at least the providing of a given form of communication, the instructions comprising:

determining from the given intent by a given orchestration engine a candidate network configuration that, when implemented, causes the given intent to be realized;

determining from the intent and/or from the candidate network configuration one or more changes to the security posture of the network that result from the candidate network configuration;

determining based on at least one given criterion whether there is sufficient correspondence between the intent and the changes to the security posture;

in response to determining that this correspondence is not sufficient, determining at least one amendment to the given intent such that, when a new candidate network configuration is determined by the orchestration engine based on the amendment, there is a better correspondence between the amended intent and the resulting changes to the security posture of the network; and implementing the new candidate configuration in the communication network.

* * * * *